United States Patent [19]

Kazaitis et al.

[11] Patent Number: 5,145,449
[45] Date of Patent: Sep. 8, 1992

[54] METHOD AND APPARATUS FOR SEVERING SHIRRED TUBULAR FOOD CASING

[75] Inventors: Michael P. Kazaitis, Chicago; John Farkonas, Glenview; Raymond A. Feldt, Dolton, all of Ill.

[73] Assignee: Viskase Corporation, Chicago, Ill.

[21] Appl. No.: 775,861

[22] Filed: Oct. 15, 1991

[51] Int. Cl.$^5$ ............................................. A22C 13/02
[52] U.S. Cl. .......................................... 452/29; 452/32
[58] Field of Search ................ 452/29, 46, 30, 31, 452/32, 36, 22, 21

[56] References Cited

U.S. PATENT DOCUMENTS

| | | | |
|---|---|---|---|
| 3,112,517 | 12/1963 | Ives | 452/21 |
| 3,209,398 | 10/1965 | Ziolko | 452/21 |
| 3,936,909 | 2/1976 | Carter | 83/171 |
| 3,942,221 | 3/1976 | Sipusic et al. | 452/29 |
| 4,052,770 | 10/1977 | Asquith | 452/29 |
| 4,153,975 | 5/1979 | Ziolko | 452/32 |
| 4,547,932 | 10/1985 | Romeike et al. | 452/29 |
| 4,622,718 | 11/1986 | Glanz | 452/29 |
| 4,885,821 | 12/1989 | Farkonas | 452/29 |

*Primary Examiner*—Willis Little
*Attorney, Agent, or Firm*—Roger Aceto

[57] ABSTRACT

Severing a shirred stick of sausage casing from casing feed stock joined to the stick is accomplished by perforating a section of the casing across its flat width prior to moving the section through a shirring zone. The section is then moved through a shirring zone and tension applied to tear the casing apart along the line of perforations. The result is that the severed ends of casing each have an edge which has a crenellated profile for at least a portion of its length and which is substantially free of casing shards that or likely to separate from the casing during a conventional stripping operation.

17 Claims, 3 Drawing Sheets

METHOD AND APPARATUS FOR SEVERING SHIRRED TUBULAR FOOD CASING

TECHNICAL FIELD

The present invention relates to the production of shirred casing sticks and more particularly to a method and apparatus for severing a shirred stick from the casing feed stock, and a shirred casing article.

BACKGROUND OF THE INVENTION

Food casings of regenerated cellulose are widely used for the production of various stuffed food products. The present invention is concerned primarily with thin walled unreinforced cellulosic casing as may be used in the production of small diameter sausages such as frankfurters and the like.

For convenience of handling, food casings which may be 20 to 50 meters or more in length are shirred and preferably compressed to produce what commonly are referred to as "shirred casing sticks". Shirring machines for producing these shirred sticks are well known in the art and are disclosed in U.S. Pat. Nos. 2,983,949 and 2,984,574 among others. Shirring and related technology also are described in the Noyes Data publication "Sausage Casing Technology" by Karmas (1974) at pages 259-347.

Cellulosic casing for the shirring operation is supplied in reels. Flat casing feed stock, drawn from the reel, is fed into a shirring machine where it is inflated with low pressure gas, usually air. The inflated casing is moved onto and along a mandrel and through a shirring zone where a shirring mechanism, usually an array of shirring rolls, gathers the casing about the mandrel into generally conical pleats nested one tightly against another. The inner folds of the pleats are formed against the mandrel and define the surface of an axial bore through the stick.

When a preselected shirred length has been attained, it is severed and moved longitudinally away from the array of shirring rolls for further processing. Such further processing may include, for example, a compaction operation where the shirred length is reduced and an operation where a closure is formed and inserted to stop or plug the bore at one end of the casing thereby forming a "closed" end. The other end of the casing is left open to permit mounting of the shirred stick onto a stuffing horn.

Severing a shirred length has been accomplished both manually and by automatic means after, i.e., downstream of the shirring zone. For example, one general method is to wait until some length of shirred casing has accumulated and then separate off a desired length from this accumulated shirred length as disclosed for example in U.S. Pat. No. 3,112,517. Another general method is to shirr only a desired length and then separate this shirred length from the feed stock. This general method is disclosed for example in U.S. Pat. Nos. 3,936,909; 4,547,932 and 4,885,821 among others.

Whatever the severing means, it is desired that the casing be cut cleanly to avoid so called "shards" or "flags" which are ragged pieces of casing attached to one or both the severed ends. When tensioning is relied upon to sever the casing shards are often formed on one or both of the , severed ends. U.S. Pat. No. 4,885,821 illustrates that in a casing under tension, a tear, which initiates at some point on the casing, propagates in opposite directions around the casing. If the ends of the tear propagation fail to meet in the same transverse plane, they overlap and run past one another. As the tear continues to propagate, one end of the tear eventually will run into the other which causes a loose piece or so called "shard" or "flag" of casing to form on one of the severed ends. If tears initiate at a plurality of points around the casing, then several shards may be formed.

Shards at the severed ends of the casing are objectionable because they may separate from the casing and become incorporated into the food product being stuffed into the casing. This is especially the case when using the casing for stuffing frankfurters. After a shirred stick is stuffed with a frankfurter emulsion, it is common for the operator to squeeze out or "milk" emulsion from the ends of the casing so the ends can be tied off. When this is done, shards at the end of the casing can rip free. Since the emulsion squeezed out of the casing is recovered and recycled, any shard of casing ripped off by the procedure may become incorporated into the emulsion supply.

Accordingly, it is most desirable to sever the shirred stick from casing feed stock in a manner which at least reduces the size of shards on the severed ends of casing, and preferably eliminates their formation.

Various severing methods have been proposed to reduce the instances of forming shards on the ends of the severed casing. For example, U.S. Pat. No. 4,885,821 discloses a severing apparatus wherein closing three arcuate members about the shirring mandrel provides a knife edge in the form of a closed circle at a location after, i.e., downstream of the shirring zone. This edge is pressed against the end face of the shirred stick to push the stick longitudinally along the mandrel and this causes the feed stock to tear away along the knife edge.

In U.S. Pat. No. 3,936,909 three arcuate members, also located downstream of the shirring zone, are closed about the circumference of an inflated section of the feed stock casing close to the end face of the shirred stick. The arcuate members form a closed circle about the casing and weakens the casing either by heating or by perforating it about substantially the full circumference of the casing. Subsequent longitudinal displacement of the shirred casing along the mandrel will cause the feed stock to separate from the stick at the weakened section.

The operation of closing arcuate members about the casing presents certain problems. For example, if the casing and arcuate members are not on the same center, the casing may not be uniformly severed so that shards on one or both severed ends results. Also, the casing which passes through the shirring zone is creased and folded. Accordingly, severing after the shirring zone may involve a casing that is not uniformly round. This means that the arcuate members closing about the casing may not uniformly engage the casing circumference, or a casing crease or fold may become pinched between adjacent arcuate member. As a further problem, tears initiated about the circumference of the creased casing may tend to follow along the fold or crease lines and this interferes with the formation of a clean, shard-free transverse severing of the casing.

In the present invention, severing occurs after or downstream of the shirring zone. However, problems associated with the proper closing of arcuate members about the casing and shirring mandrel as well as the severing problems associated with attempting to sever casing creased and folded by shirring are minimized by preparing the casing feed stock for severing prior to entering the shirring zone.

In particular, the casing is prepared by weakening the feed stock along a narrow transverse band at a defined location along its length prior to entering the shirring zone. After the casing moves through the shirring zone, a tensile stress applied to the feed stock casing will easily sever it at the weakened area.

OBJECTS OF THE INVENTION

One object of the present invention is to provide an improved method and apparatus for severing a length of shirred casing from the feed stock casing.

Another object of the present invention is to provide a method and apparatus for severing a length of shirred casing from the feed stock which minimizes or eliminates the presence of objectionable shards on the severed ends of casing.

A further object of the present invention is to provide a casing severing method and apparatus in which severing after shirring is facilitated by transversely weakening the casing at a given location along its length prior to shirring.

Yet another object of the present invention is to provide a casing severing method and apparatus wherein severing shirred casing is facilitated by transversly perforating the feed stock casing prior to shirring and then separating the casing after shirring along the line of perforations.

Still another object of the present invention is to provide a casing severing method and apparatus in which shards which may be formed are so reduced in size that they are not likely to tear free of the casing during a conventional stripping operation.

A still further object is to provide a shirred stick wherein the severed ends of the casing at both the first-shirred and last-shirred ends of the stick are substantially free of shards which may rip free of the casing during an emulsion stripping operation.

SUMMARY OF THE INVENTION

In one aspect, the invention is characterized by a method of severing a stick of shirred casing from a length of reel stock casing joined to the stick including the steps of:

a) weakening a section of feed stock casing to form a frangible band of casing extending transverse the casing longitudinal axis and around its circumference;

b) moving feed stock casing including the frangible band in the direction of the casing longitudinal axis towards and through a shirring one;

c) shirring, in the zone, at least a length of the feed stock casing preceding the frangible band; and thereafter d) tensioning the casing across the frangible band and tearing apart the casing along the frangible band thereby separating the shirred length from the feed stock casing.

In another aspect, the invention is characterized by an apparatus for shirring and severing a stick of shirred casing from a length of reel stock casing joined to the stick comprising:

a) shirring means defining a shirring zone;

b) first means for feeding tubular feed stock casing in a longitudinal direction through said shirring zone where said feed stock is gathered by said shirring means into pleats to form a shirred stick of casing;

c) second means located prior to the shirring zone for transversly weakening a flattened section of said feed stock casing to provide a narrow frangible band of casing extending about the circumference of the feed stock casing; and d) third means located after the shirring zone for tensioning the feed stock casing across said frangible band and tearing apart the casing along said frangible band.

The resulting casing article is a shirred stick of casing wherein having the opposite ends of the casing each have a transverse terminal edge which is crenellated over at least a portion of its length.

In accordance with the present invention, the feed stock casing is weakened, but not severed, prior to shirring to provide a narrow frangible band extending around the casing. The frangible band remains strong enough to withstand the rigors of shirring but will tear under tension. Weakening the casing may be accomplished by any suitable means such as by working the casing to perforate, score, thin, abrade or otherwise degrade the tubular wall of the casing along a narrow transverse band that extends about the circumference of the casing.

For example, the casing can be scored about its periphery by just cutting into, but not through the casing wall, or the casing wall can be thinned by pressing or weakened by transversly creasing the feed stock. A hot wire also could be used to embrittle a narrow band of casing.

A preferred method according to the present invention, is to weaken the casing transversely by making a line of perforations across the flat width of the feed stock casing before the casing enters a shirring zone. This line of perforations sufficiently weakens a narrow band of the casing at a specific location along the casing length. Thereafter, when the casing is subjected to a tensile stress, the casing will tear apart along the line of perforations. The tear propagates from one perforation to another so the likelihood of forming a shard is reduced, and in any event, shards or flags of casing which may be produced tend to be so minute that they will not detract from the commercialization of the shirred casing.

Preferably the line of perforations in the feed stock should be made while holding the casing feed stock in a flattened condition. This allows the perforating means to penetrate completely through the casing. Also, the perforations should extend across the entire flat width of the casing. The result is that when the casing is inflated for shirring, a line of perforations will extend around the entire circumference of the casing.

The perforations can take several forms. For example, a row of closely spaced sharpened pins can be used to make round perforations. Using a knife with a serrated edge will make a straight row of perforations across the casing. If either sharpened pins or a knife with tapered serrations is used, the depth of penetration through the flattened casing should be controlled. If the penetration is too deep, the tapered configuration of the pins or serrations may produce openings so large that the casing is weakened to the point where moving it through the shirring zone will cause it to separate. Conversely, if the penetration is too shallow, the desired weakening of the casing is not produced so separation may not follow along the line of perforations.

The problem of penetration depth is avoided by using a perforating means having a sharpened edge provided with straight-sided teeth so the length of each perforation is constant regardless of the depth of penetration.

It should be apparent that whatever the shape of the perforating means, an important consideration along the line of the perforations is the number and length of perforations relative to the lands between the perforations. As noted above, the casing should not be so weakened by the number and length of the perforations that the forces applied to pull the casing into and through the shirring zone will cause the feed stock to sever prematurely. Conversely, if the casing is not sufficiently weakened, the casing may not cleanly sever along the line of perforation during the subsequent severing operation. The result may be severed edges so ragged with loose shards as to be unacceptable for the stripping operation that may follow stuffing.

It should be noted that whether a product is acceptably free of loose shards or flags of casing is subjective and depends in part on their number, size and distribution along the severed edge. The color of the casing also may enter into a consideration of acceptability since shards of a clear casing may be less noticeable than shards of a colored casing. The ultimate goal is to have a clean, shard free severed end. However, the goal of an acceptable casing is considered achieved if shards which are formed are so small that they do not readily detach from the casing during a conventional stripping operation.

According to the present invention, the perforations can be made at any point before the feed stock casing feeds onto the shirring mandrel. For example, the casing unwinds from a supply reel and is inflated after passing through a pair of nip rolls. The inflated casing then is laced onto the shirring mandrel. At any point prior to the shirring mandrel, the casing is, or may be, pressed to a flat width. Thus, the perforations can be made on the flat feed stock casing at a location between the supply reel and nip rolls of after the nip rolls. If the casing is perforated after inflation, a section of the inflated casing preferably is pressed flat and perforated. It also is possible to determine the length of casing to be contained in a stick and then perforate the casing at intervals corresponding to this length as casing is wound onto the supply roll. However, this is not preferred because in this ease some accommodation must be made to control the operation of the shirring machine so the length shirred for each stick is coordinated with the length of the casing in the interval between the transverse perforations.

DETAILED DESCRIPTION OF THE INVENTION

Figure 1:
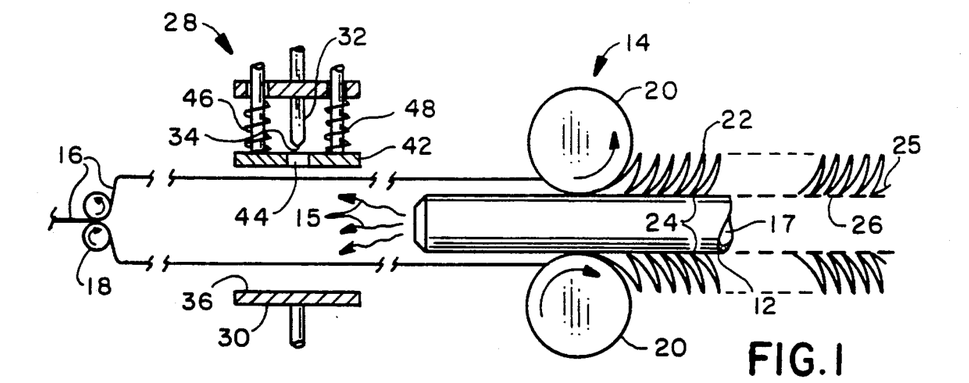
FIGS. 1-6 illustrate in schematic fashion the method steps of the present invention.

Referring to the drawings, FIG. 1 shows several elements of a conventional shirring machine as modified to incorporate components for severing the casing according to the present invention. The shirring machine itself is conventional. Only those components necessary to an understanding of the present invention will be described in detail. For example, a conventional shirring machine includes a mandrel 12 and a shirring head 14. It should be appreciated that the shirring machine can be either of the two types in general commercial use including a so-called "floating mandrel machine" of the type generally described in U.S. Pat. No. 3,766,603 or a "withdrawing mandrel" machine as generally described in U.S. Pat. No. 2,583,654.

Flattened feed stock casing 16 is drawn from a supply reel (not shown) and is fed onto the mandrel through the nip of driven feed rolls 18. As the casing passes onto the mandrel, it is inflated by a stream of air 15 issuing from an axial passage 17 in the mandrel.

Lubricants and/or moisture or other treatments incorporated into this air stream may be applied to the casing inner surface as is well known in the art. The inflated casing moves in the direction of its longitudinal axis along the mandrel and into the shirring head 14. The shirring head defines a shirring zone in which the inflated casing is gathered or shirred into pleats about the mandrel 12 to form a shirred stick 22 which exits from the shirring zone. The innerfolds 24 of the pleats are formed against the mandrel and define a longitudinal bore 26 through the shirred stick. The shirring head 14 may comprise any of the known shirring means as described, for example, in U.S. Pat. Nos. 3,461,484, 4,185,358, 4,370,780 or 4,374,447 among others. For purposes of illustration, the shirring head 14 is shown as comprising a plurality of toothed shirring rolls 20, usually three in number of a general type which is described in U.S. Pat. No. 3,461,484.

It should be appreciated that the shirring proceeds in conjunction with conventional and known shirring techniques including the application of lubricants to the external surface of the casing and in conjunction with known shirred casing holdback means (not shown). This holdback means retards the advance of the shirred pleats along the mandrel in order to provide a substantially regular pleat formation wherein the pleats are laid tightly one against another. In a preferred embodiment the shirring rolls lay the pleats at an angle of about 30° with respect to the longitudinal axis of the mandrel so that the overall shirred length is somewhat like a stack of interconnected nesting cones. In a conventional shirring operation, the outside diameter of the shirred stick 22 is larger than the inflated diameter of casing feed stock 16.

After a desired length of casing has been shirred, the shirred stick must be separated from the feed stock. Once the shirred stick is separated, it may be subject to further operations (not shown) such as a compaction step to further reduce its length and a step to provide one end of the stick, e.g., the first shirred end 25, with a closure means.

For purposes of separating the shirred stick 22 from the feed stock 16, FIG. 1 shows a means generally indicated at 28 for working the casing to weaken it. Preferably the casing is weakened by perforating it so the means 28 is referred to as a perforating means. The perforating means 28 is positioned on the upstream size of the shirring zone, i.e. to the left of shirring head 14 as viewed in the figures. Preferably, the perforating means is located, as shown, between shirring head 14 and nip rolls 18 so it operates on casing which is at least partly inflated or expanded from its flattened condition. However, the perforating means also may be located upstream of the nip rolls or even at the nip rolls, in either case, so it operates on flat casing prior to inflation.

As will be described further hereinbelow, the perforating means 28 functions to prepare the feed stock casing for severing. This preparation occurs prior to the casing entering the shirring zone and facilitates the severing which occurs after the casing has passed through the shirring zone.

As shown in FIG. 1, one component of the perforating means is an anvil 30 at one side of the feed stock casing. A second component of the perforating means is a knife blade 32 which is located on the opposite side of the casing from the anvil. The blade is oriented perpendicular to the anvil and transverse the longitudinal axis of the casing. The edge 34 of the knife which is towards the casing is the knife cutting edge. The knife 32 and anvil 30 are movable one towards the other from an open position as shown in FIG. 1 to a closed position shown in FIG. 2. At the closed position, the knife blade 32 is closed against the anvil surface 36.

Figure 9:
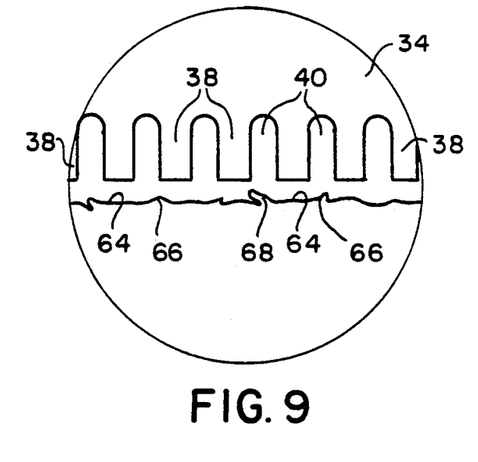
FIGS. 9 and 10 are each magnified views, of a portion of the severed end of the casing juxtaposed to a serrated knife blade used in preparing the casing for severing.
Figure 10:
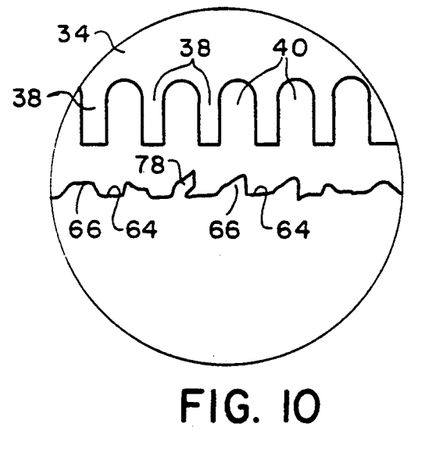

The knife edge 34 is not a continuous cutting edge, but is serrated as shown in FIGS. 9 and 10. Thus, when the knife closes against the anvil, the casing between the serrated knife edge and anvil is perforated. The serrations 38 along the knife edge 34 preferably have straight sides so the cutting edge is crenellated. With this arrangement the length of each perforation is not dependant upon the depth of the penetration of each serration through the casing. It has been found that a suitable knife blade is about 0.406 mm thick. The serrated edge has a pitch of about 0.508 mm wherein each straight sided serration 38 is each about 0.254 mm wide and each space 40 between serrations is about 0.254 mm wide. Such a blade is made by electro discharge machining the cutting edge of a conventional slotted razor blade to provide the serrated edge. For example, a suitable blade is a slotted, round end blade No. 00053 from CB Manufacturing and Sales Co., Inc.

To properly perforate the casing, the structure or material of the anvil surface must permit the knife serrations to pass cleanly through the casing engaged between the knife and the anvil. For example, a hard, rigid anvil surface may prevent the serrations from passing completely through the casing and may quickly dull the knife. A soft anvil surface may not provide the resistance needed to permit the knife serrations to penetrate the casing and will wear quickly. A preferred anvil surface is sufficiently resilient to permit some "give" as the knife serrations are pressed against it so that they can pass through the casing, yet is hard enough to avoid excessive wear. It has been found that a urethane pad having a type A durometer hardness of 80 provides a suitable anvil surface. A possible alternative is to provide the anvil surface 36 within a transverse groove (not shown) to receive the knife edge. The casing would bridge the groove and be supported as the knife serrations penetrate the casing and enter the groove.

As noted above, the perforations preferably are made across the flat width of the casing. Accordingly, to press the expanded feed stock casing to a flat width, FIG. 1 shows that perforating means 28 includes a pad 42 having a central opening 44 to accommodate the knife blade so that a portion of the pad is located at each side of the knife blade. The pad moves slightly in advance of the knife blade so the knife does not perforate the casing until after the pad 42 has contacted the casing and pressed it against the anvil surface 36. Coil springs 46, 48 bias the pad which allows the knife to continue to travel through opening 44 and the anvil.

In operation, the shirring of the inflated feed stock 16 as illustrated in FIG. 1 progresses until the desired length of shirred stick 22 accumulates on mandrel 12. The feeding and shirring operations stop and several events occur in rapid sequence.

Figure 2:
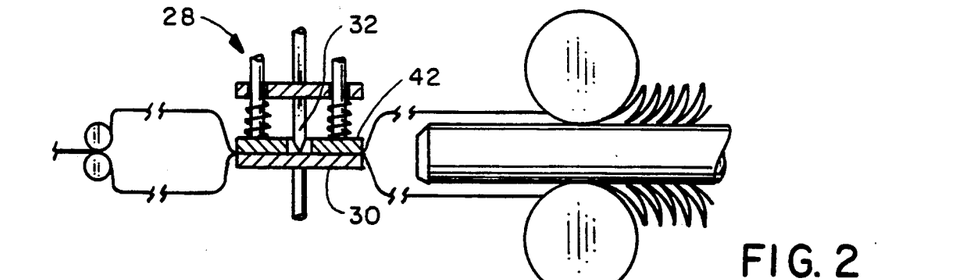
Figure 3:
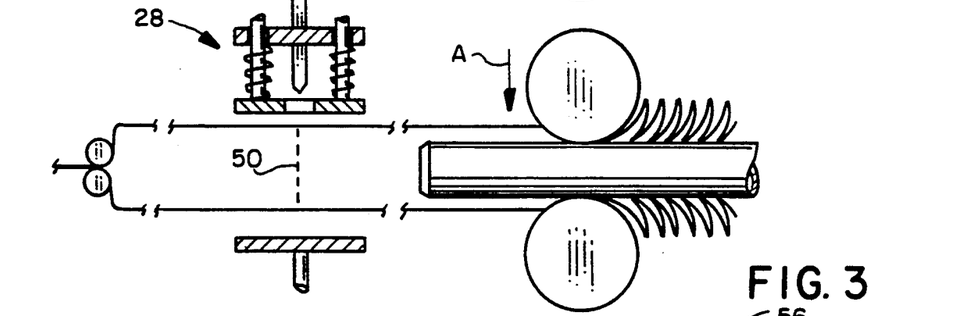

The severing means 28 closes against the casing to the position shown in FIG. 2. The inflating air may be turned off or reduced prior to flattening. In either case, as the severing means closes, anvil 30 and pad 42 first engage and then collapse the casing to substantially the flat width of the casing in advance of the knife edge 34. When the serrated knife edge reaches the anvil 30, it presses the casing to the anvil surface and the serrations penetrate the casing to provide a line of perforations 50 which extend across the flat width of the casing (FIG. 3).

The severing means 28 then opens. While some inflating air may escape through the perforations, the air flow nevertheless is sufficient to reinflate the casing. In its reinflated condition, as shown in FIG. 3, the perforations made by the serrated knife edge now form a line of perforations 50 which extends about substantially the entire circumference of the casing.

The feeding and shirring operations start again and proceed until the line of perforations 50 has reaches a location indicated at "A" which is just upstream from the shirring zone. Before the line of perforations can pass through the shirring zone, the feeding and shirring operations stop and the inflating air is turned off or at least the pressure is reduced.

Figure 4:
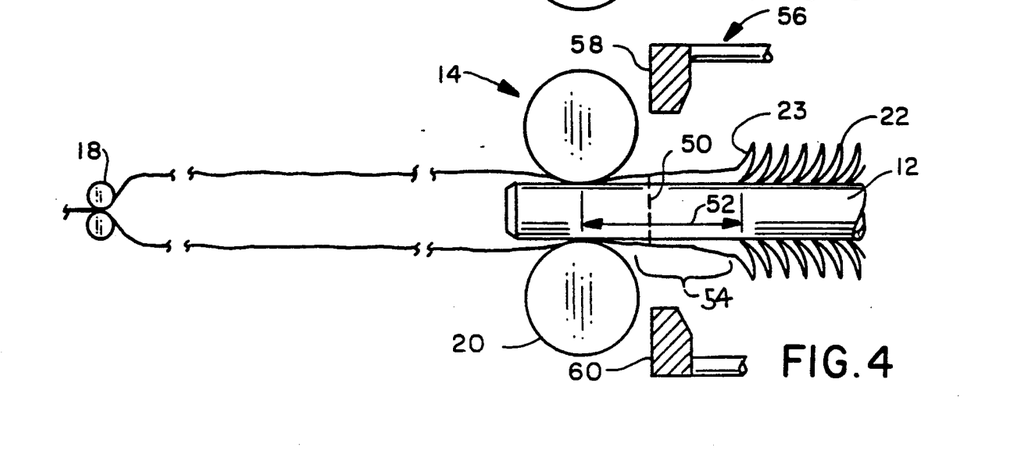

FIG. 4 shows that the mandrel 12 then is displaced several inches in the shirring direction (longitudinally to the right as shown in the figures). The longitudinal displacement of mandrel 12 carries the shirred stick 22 away from the shirring rolls 20 and, at the same time, the shirring rolls 20 and feed rolls 18 rotate so a section 52 of casing containing the line of perforations 50 is pulled through the shirring zone. The result, as shown in FIG. 4 is twofold. First a space 54 is provided between the shirring rolls 20 and the last-shirred end face 23 of the shirred stick. Second, the section 52 of feed stock casing in this space and which contains the line of perforations 50 is not shirred so it is relatively free of creases and folds.

Providing a section of casing 52 which is not shirred also can be accomplished by rotating the feed rolls 18 to provide slack casing between the feed rolls and shirring head 14. Now, when the mandrel is displaced longitudinally to the right to the FIG. 4 position, this slack casing is pulled through the shirring head and forms the casing section 52.

The purpose of providing the clearance space 54 is to expose the last-shirred end face 23 of the stick so a stick transfer means 56 can contact and press directly against the end face. Exposure of the end face 23 also can be achieved by translating the shirring rolls 20 forward (to the left as viewed in the figures) or by opening them radially.

Next, the casing feed stock is prevented from moving in the shirring direction by braking the feed stock reel or by clamping the feed stock to the mandrel. Preferably, it is accomplished by holding the feed stock at the nip provided by the stopped feed rolls 18.

Figure 5:
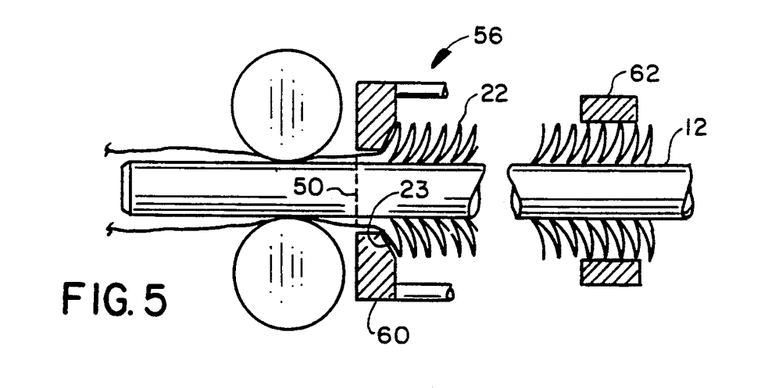

The shirred stick transfer means 56, including a set of jaws 58, 60 closes radially into the space 54 and towards the mandrel 12. After the jaws close, the mandrel returns to its start position (to the left as viewed in the Figures) which seats the end face 23 against the jaws as shown in FIG. 5. The shirred stick 22 is not seized on the mandrel so the mandrel moves relative to the stick after the end face 23 is seated against the closed jaws.

A split ring 62 closes about the outside surface of the shirred stick and a drive means (not shown) is operated to move the closed jaws 58, 60 longitudinally in the shirring direction to move the stick 22 along the mandrel 12 and away from the shirring head 14.

The inside diameter of split ring 62 is slightly smaller than the outside diameter of stick 22. Accordingly, the closed split ring will resist, but not prevent, the movement of the stick by the closed jaws. It should be appreciated that closing the split ring 62 about the stick creates a drag to resist the movement of the shirred stick which, in turn, keeps the end face 23 of the stick seated tightly against the jaws 58, 60 as the transfer means 56 moves the shirred stick to the right as viewed in the figures. This prevents shirred casing from deshirring off the end face 23 of the stick.

Figure 6:
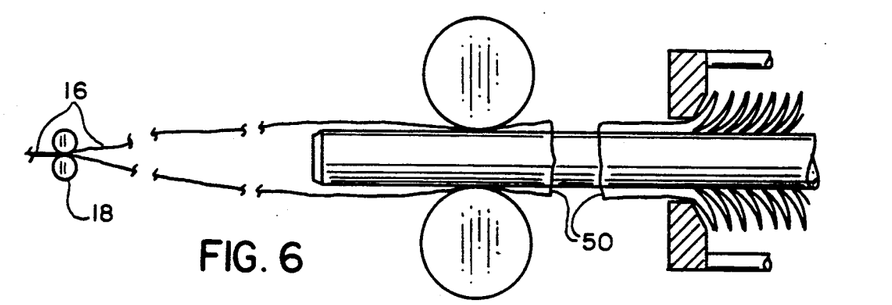

On one hand, the nip at the feed rolls 18 holds and prevents the movement of the feed stock casing 16 in the shirring direction as the stick moves. On the other hand, the pressing engagement of the jaws 58, 60 against the end face 23 of the stick acts to hold the casing against the end face. The result, as the stick is pushed in the shirring direction, is that the portion of the casing feed stock 16 between the nip of feed rolls 18 and the jaws 58, 60 is put into tension. Since the line of perforations 50 has weakened the casing, the tension created across the line of perforation causes the casing to tear apart wherein the tear propagates along the line of perforations as shown in FIG. 6. The shirred stick now separated from the feed stock casing is transferred down the mandrel. The shirring machine components return to a start position, the inflating air is turned on and the next shirring cycle is started.

The line of perforations 50 forms a frangible band extending around the circumference of the casing. As the casing parts along this frangible band, it is speculated that tears initiate at many locations simultaneously around the casing at stress concentration points at the ends of the perforations. These tears however, propagate only a short distance before either running into an adjacent perforation or into a tear emanating from an adjacent perforation. The result as illustrated in full scale in FIG. 8 is a casing end 72 having its terminal edge 74 extending normal to the longitudinal axis of the casing.

Figure 7:
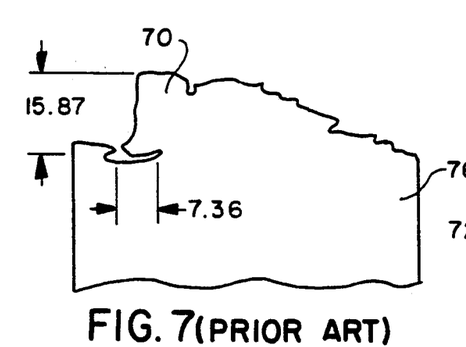
FIG. 7 is a full scale view showing the end of a casing severed according to a prior art method.
Figure 8:
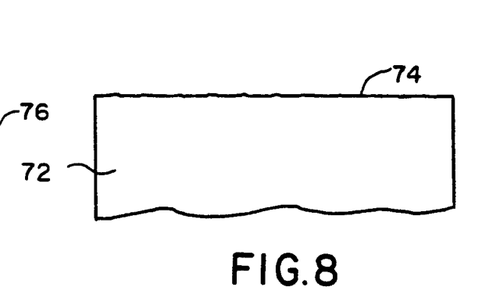
FIG. 8 is a full scale view showing the end of a casing severed according to the present invention.

FIG. 8 is a full size view of a severed casing end 72 wherein the casing has been slit longitudinally and laid flat so the full circumference of the severed end can be examined. This end corresponds to the casing end at the last shirred end face 23 of the shirred stick. In contrast, FIG. 7 shows the corresponding end 76 of a casing severed in accordance with a conventional severing method. The casing in each instance was a Viskase Corporation NOJAX cellulosic casing having a nominal diameter of about 21.08 mm. The casings were both shirred in the identical fashion on the same shirring machine. Severing to produce the prior art casing as shown in FIG. 7 was in accordance with the teachings of U.S. Pat. No. 4,885,821. As taught in the '821 Patent a member, including an annular knife edge, was closed about the end face 23 of the shirred stick. The member was then moved longitudinally and pressed against the end face 23 of the shirred casing while holding the feed stock casing at the nip rolls 18. This put the casing in tension so it tore along the annular knife edge. This arrangement was changed slightly to make the severed end 72 according to the present invention as shown in FIG. 8. In particular, the knife edge was removed from the member so only an unsharpened portion of the member was closed and pressed against the casing end face 23. Also a perforating means 28 was added and the apparatus was operated in accordance with the method of the present invention.

The terminal edge of the prior art severed end 76 as seen in full size in FIG. 7 includes a shard 70 measuring approximately 7.36×15.87 mm.

In contrast, the casing severed according to the present invention, also seen in full scale, (FIG. 8) has a transverse terminal edge 74 which is considerably sharper and less ragged than the casing end of FIG. 7.

FIGS. 9 and 10 each show a portion of a severed casing end of the invention under 20× magnification juxtaposed with the knife blade used to perforate the casing as described above. In FIG. 9, the blade used had teeth 0.254 mm wide separated by a space of 0.254 mm.

FIG. 10 is similar to FIG. 9 except the knife blade shown juxtaposed to the severed end has teeth 0.177 mm wide separated by a space of 0.330 mm. Thus, the pitch of the serrated edge of this blade is similar to that shown in FIG. 10, but the individual teeth are narrower.

In each case (FIGS. 9 and 10) one or more shards can be identified as for example at 68 in FIG. 9 and at 78 in FIG. 10. However, the shard 68 measures only about 0.178×0.203 mm and the shard 78 measures only about 0.229×0.279 mm. These shards apparently formed when a tear propagated slightly around an adjacent perforation rather than into it. These shards, as seen under 20× magnification would not detract from the commercial use of the casing because shards of this size are not likely to be grasped and torn free from the casing edge by a conventional stripping operation.

The straight, sharp edge segments 64 produced by the serrated knife blade edge perforating the casing are readily identified at various locations along the severed ends. Between edge segments 64 there are land segments 66 that are raised slightly above the plane of the segments 64. These land segments 66 represent the unperforated casing which has torn between the perforations. In some instances these land segments 66 are relatively flat and in other instances, they are more triangular. In either case, the combination of the straight, sharp edge segments 64 and adjacent land segments 66 gives the severed end a crenellated appearance over at least a portion of its length.

Figure 11:
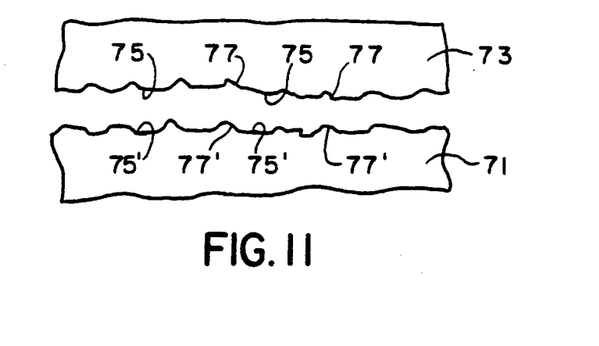
FIG. 11 is a magnified view showing portions of the adjacent ends of casing severed in accordance with the present invention.

FIG. 11 shows the profile of a portion of two adjacent severed ends magnified about 20×. Casing end 71 is the end associated with the last-shirred end face 23 of the shirred length 22. Casing end 73 is the end associated with the feed stock casing. This end 73 will become the end of a shirred length formed to an end closure and accordingly, it corresponds to the end of a shirred length identified at 25 in FIG. 1.

FIG. 11 illustrates that the opposite ends of a shirred casing article according to the present invention will each have a transverse terminal edge which is crenellated over at least a portion of its length. As shown in FIG. 11, the straight edge segments produced when the casing is perforated by the knife edge define the lands 75 on severed end 73 and the valleys 75' on the opposite severed end 71. Conversely, the torn casing between the perforations define the valleys 77' on the severed end 73 and the lands 77, on the opposite end 71.

In any event, shards which may appear along either edge, are not likely to detract from the commercial use of the casing so that both ends can undergo a stripping operation.

Thus, it will be appreciated that the present invention provides a method and apparatus for severing casing which produces a straight transverse edge substantially free of shards or flags of casing likely to pull or tear free of the casing during use.

In a preferred embodiment, the perforated section of casing is not shirred so there are no extraneous creases or folds which may interfere with the tearing apart of the casing along the line of perforations. However, it should be appreciated that the section of casing containing the line of perforations 50 can be shirred. This means a few of the last shirred pleats containing the line of perforations must be deshirred from the end face 23 of the stick prior to the operation of the transfer means 56.

It also is possible to stop the flow of inflating air prior to closing the serrated knife against the casing. However, the inflating air can be left on if a pressing means is provided to press and hold the inflated casing to a flat width prior to moving the serrated knife against the casing. Moreover, while the description herein refers to stopping the shirring operation to perforate the casing, a knife that tracks along the casing for a short distance or a rotary knife may be used to perforate the casing without stopping the movement of the casing in the shirring direction.

Having described the invention in detail, what is claimed as new is:

1. A method of separating a length of shirred casing from a length of feed stock casing comprising the steps of:
   a) weakening a flattened section of feed stock casing prior to shirring to form a frangible band of casing extending transverse the casing longitudinal axis and around its circumference;
   b) moving feed stock casing including the frangible band in the direction of the casing longitudinal axis towards and through a shirring zone;
   c) shirring, in the zone, at least a length of the feed stock casing preceding the frangible band; and thereafter
   d) tensioning the casing across the frangible band and tearing apart the casing along the frangible band thereby separating the shirred length from the feed stock casing.

2. A method as in claim 1 wherein moving the frangible band of casing through the shirring zone is accomplished without shirring said frangible band.

3. A method as in claim 1 wherein weakening the flattened section of feed stock casing is accomplished by perforating the flattened section of casing to provide a succession of closely spaced perforations, the succession of perforations forming the frangible band.

4. A method as in claim 1 wherein flattened feed stock casing is drawn from a supply roll, inflated to open the casing, the open casing is moved into the shirring zone and shirred, further comprising the steps of:
   a) collapsing the open casing to substantially its flat width to form said flattened section of casing; and thereafter
   b) weakening said flattened section.

5. A method as in claim 4 including:
   a) reinflating the feed stock casing after said weakening step and shirring a length of feed stock casing preceding the frangible band of casing;
   b) stopping the shirring of the feed stock casing prior to the frangible band of casing entering the shirring zone; and
   c) moving the frangible band of casing through the shirring zone without shirring the frangible band.

6. A method as in claim 1 including:
   a) accumulating a shirred length of casing which merges with feed stock casing in the shirring zone;
   b) longitudinally separating the shirring zone and the shirred length to provide a space therebetween and locating the frangible band of casing in said space;
   c) holding the feed stock casing at one side of the frangible band of casing while longitudinally moving the shirred length thereby tensioning the feed stock casing and tearing it from the shirred length along the frangible band.

7. A method of separating a length of shirred casing from a length of unshirred feed stock casing wherein flattened tubular casing is drawn from a feed stock on a supply roll, inflated and moved longitudinally over a mandrel and into a shirring zone, shirred in the shirring zone to form a shirred strand of casing such that one end face of the strand merges with unshirred casing in the shirring zone, including the steps of:
   a) prior to moving the inflated casing over the mandrel, perforating a section of the casing such that a line of perforations extends around the circumference of the casing;
   b) moving the perforated section of casing over the mandrel and through the shirring zone; and thereafter
   c) subjecting the perforated section to tension across the line of perforations to tear apart the casing along the line of perforations.

8. A method as in claim 7 including moving the perforated section though the shirring zone without shirring the perforated section.

9. A method as in claim 7 including flattening the section of casing prior to said perforating step and said perforating step is accomplished while maintaining the section of casing in the flattened condition to provide a succession of closely spaced perforations extending transverse the flat width of the section.

10. A method as in claim 9 wherein flattening the section of feed stock casing and perforating it occur after inflating.

11. A method as in claim 10 including first terminating said inflating and then flattening and perforating the section of feed stock casing.

12. Apparatus for severing a stick of shirred tubular food casing from feed stock casing comprising:
   a) shirring means defining a shirring zone and a shirring mandrel extending through said zone wherein tubular feed stock casing is fed in a longitudinal direction onto a first end of said mandrel and along said mandrel to said shirring zone where said feed stock is gathered into pleats against said mandrel to form a shirred stick of casing;
   b) first means located prior to said mandrel first end for transversely weakening but not severing a flattened section of said feed stock casing to provide a narrow frangible band of casing extending about the circumference of the feed stock casing; and c) second means located after the shirring zone for tensioning said section of feed stock casing across said frangible band after passage of said section to said shirring zone and tearing apart the casing along said frangible band.

13. Apparatus as in claim 12 wherein said first means is a perforating means for forming a succession of closely spaced perforations across the flat width of the casing, said succession of perforations defining said frangible band.

14. Apparatus as in claim 14 wherein said perforating means includes an anvil and a casing perforator disposed on opposite sides of the casing said anvil and casing perforator being movable one towards the other and against the casing.

15. Apparatus as in claim 14 wherein said feed stock casing is expanded to an open position and said perforating means includes members adjacent said casing perforator and movable in advance of said casing perforator for engaging and flattening the open casing to substantially its flat width.

16. Apparatus as in claim 14 wherein said casing perforator is a knife blade having a serrated cutting edge.

17. Apparatus as in claim 16 wherein said serrated knife edge comprises a plurality of straight sided teeth.

* * * * *

UNITED STATES PATENT AND TRADEMARK OFFICE
CERTIFICATE OF CORRECTION

PATENT NO. : 5,145,449
DATED : September 8, 1992
INVENTOR(S) : Michael P. Kazaitis/John Farkonas/Raymond A. Feldt It is certified that error appears in the above-identified patent and that said Letters Patent is hereby corrected as shown below:

Col. 1, line 65, after "the" delete ",".

Col 5, line 41, delete "of" and insert --or--.

Col. 13, line 14, delete "claim 14" and insert --claim 13--.

Signed and Sealed this

Nineteenth Day of October, 1993

Attest:

BRUCE LEHMAN

*Attesting Officer*     *Commissioner of Patents and Trademarks*